Feb. 6, 1962  M. UMANOFF  3,019,953
REMOVABLE UNDER-CARRIAGE SHELF FOR SHOPPING CARTS
Filed May 26, 1960

INVENTOR:
Martin Umanoff
BY
Frederick Breitenfeld
attorney

3,019,953
REMOVABLE UNDER-CARRIAGE SHELF FOR SHOPPING CARTS

Martin Umanoff, Huntington, N.Y., assignor, by mesne assignments, to R. A. MacPlum Industries, Inc., a corporation of New Jersey
Filed May 26, 1960, Ser. No. 31,973
4 Claims. (Cl. 224—42.43)

This invention relates generally to shopping carts of the type currently in wide use in supermarkets, such carts having a wheeled under-carriage and a bin mounted thereon to accommodate merchandise.

Some of the types of shopping carts now in use are provided with a platform or shelf on the under-frame below the bin, the platform being generally used for holding containers of bottles or other large goods which do not conveniently fit into the bin along with the other goods purchased by the customer. The type of platform or shelf so employed is usually of relatively small size and thus it does not always support, with complete stability, the goods placed upon it. Moreover, such a type of fixed platform often interlocks with parts of other carts when the carts are nested, making separation of the nested carts difficult. In addition, since in many instances the platform or shelf is not used by a substantial number of store customers, and in view of the fact that every cart is ordinarily provided with a permanent shelf or platform it is apparent that the manufacturing cost includes certain unwarranted expense.

Shelves or platforms of the kind above described are usually composed of spaced metal rods and are provided with no means for securely and positively holding goods on them with the result that the goods often topple over while the cart is moved about the store.

It is a general object of the present invention to provide a shelf or platform which can be removably fitted on the undercarriage of a shopping cart below the bin thereof and which will eliminate the difficulties above pointed out. It is a further object to provide a platform or shelf which can be readily attached to and removed from the cart without requiring the use of tools; which will be adjustable for engagement with articles or goods of various shapes and sizes placed upon it, and which will so engage the goods as to prevent shifting or toppling of them during the travel of the cart.

One way of achieving these objects and advantages, and such other objects and benefits as may hereinafter appear or be pointed out, is illustrated in the accompanying drawings, in which—

Figure 2:
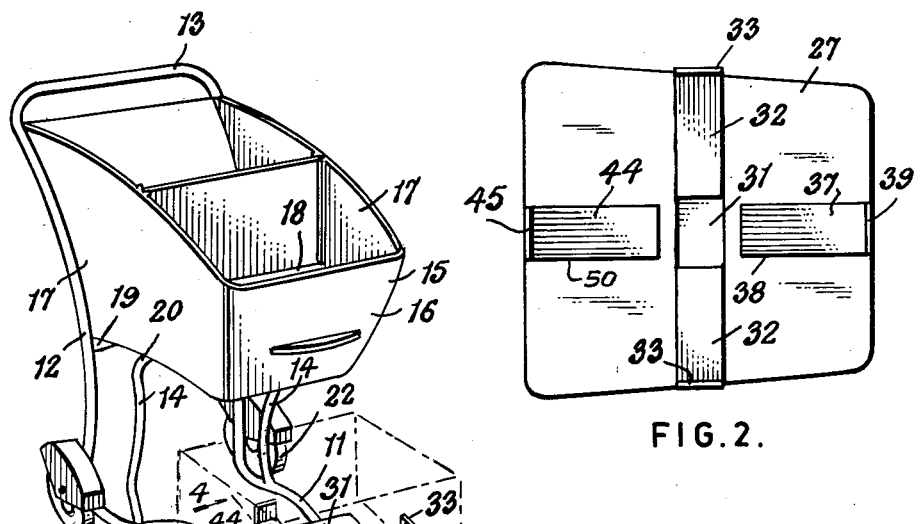
FIG. 2 is a top plan view of the platform.
Figure 1:
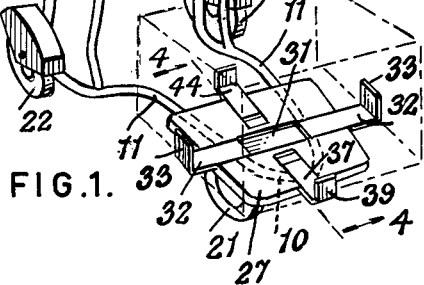
FIG. 1 is a perspective view of a shopping cart provided with a detachable platform or shelf constructed according to the invention.

The illustrated type of shopping cart to which the improved platform or shelf is applied, is provided with an under-carriage composed essentially of tubular rod material, preferably metal. The main element of the under-carriage is bent and shaped to define a substantially V-shaped base adjacent to the floor, the apex 10 of the V being toward the front of the cart and the arms 11 diverging rearwardly. At their rear ends, the arms 11 are bent upwardly to define rear parts 12. The latter are curved convexly forwardly, as shown in FIG. 1, and merge at the top in a transverse section 13 constituting the handle of the cart. The second section of the under-carriage consists of tubular rods 14 fastened at their lower ends to the arms 11 and suitably shaped to form a support for the merchandise bin 15. In the form shown, the bin 15 is composed of a molded, non-metallic material such as suitable plastic, and it includes a front wall 16, side walls 17, and a bottom wall 18. The bottom wall may be suitably attached to and supported by a cross rod 19 extending between the posts 12 and may also be secured to a bin support 20 at the top of the rods 14.

The wheels of the under-carriage consist of a single front swivel wheel 21 and a pair of rear wheels 22. The front wheel of the three-wheel arrangement is journaled in a yoke 23 rotatably connected at 24 to a supporting plate 25. The plate 25 is secured by rivets or otherwise to the V-arms 11 at a point rearwardly of the apex 10 of the V-shaped base. This arrangement is such that it results in the formation of a substantially half-round opening 26 extending between the apex 10 and the plate 25. The improved platform or shelf, to be presently described in detail, is primarily adapted for use in connection with a cart of the construction above described, but it is to be understood that the platform or shelf is capable of attachment to and use upon carts of other construction.

Figure 3:
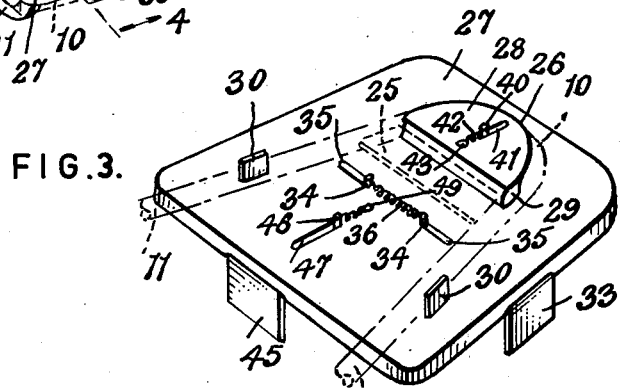
FIG. 3 is a perspective view of the underside of the platform.
Figure 4:
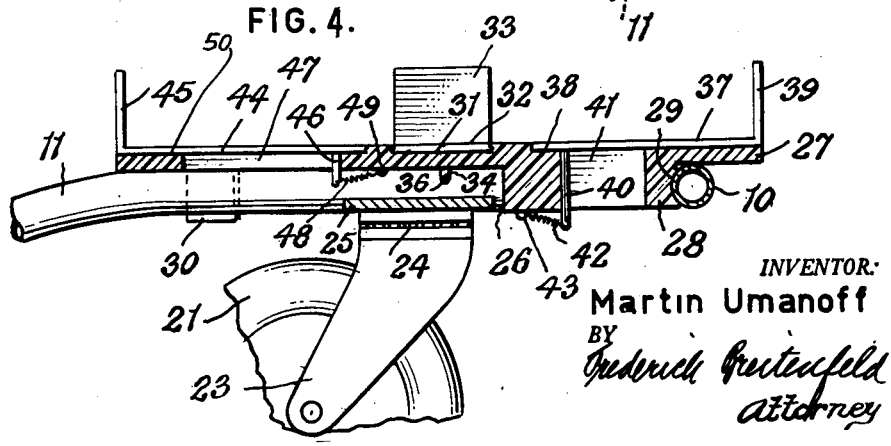
FIG. 4 is a sectional view, taken substantially on the line 4—4 of FIG. 1.

The primary element of the platform or shelf is a base member or supporting plate 27, which may conveniently be composed of a plastic material or other suitable substance. The supporting plate 27 is of a shape and size to enable it to fit on top of the V-shaped portion of the under-carriage and be supported thereby. On its bottom, the plate 27 is formed or otherwise provided with a block 28 conforming rather snugly to the shape and size of the opening 26, so that the block will fit in said opening between the apex 10 and the plate 25. As will be seen in FIGS. 3 and 4, the forward edge of the block is arcuately curved in a vertical plane as at 29, as well as in a horizontal plane, so as to conform to both the longitudinal and the transverse curvature of the tubing forming the apex 10. The resiliency of the plastic material of which the base member or plate 27 is composed permits the block 28 to be sprung or forced into place in the opening 26 and be frictionally retained in position by such engagement.

Extending downwardly from the bottom surface of the base member or plate 27 near its rear end is a pair of spaced lugs 30, the spacing of these lugs and their positioning relative to the V-arms 11 being such as to cause the lugs to frictionally engage the V-arms 11, thus maintaining the base member or plate 27 against pivotal or lateral shifting movement.

Provided in the upper face of the plate 27 is a transverse dove-tail groove 31 for the accommodation of a pair of side clamps 32 which are adjustable toward or away from each other by sliding movements in the groove. As may be seen in FIG. 4, the edges of each clamp 32 diverge from the top surface of the clamp to the bottom surface, so as to conform to the dove-tail contour of the slot 31. Each clamp is in the form of an elongated plate having an upturned end 33. Extending downwardly from the bottom of each clamp is a pin 34, said pins projecting through slots 35 in the plate 27, and being connected on the under side of plate 27 by a coil spring 36 tending to draw the clamps in a direction toward each other to the extent permitted by the limits of the slots 35.

At 37 is a front clamp substantially similar in shape to the side clamps 32. It is slidable in a dove tail slot 38 in the upper surface of the base member of plate 27. The slot 38 terminates before reaching the slot 31. Clamp 37 has a forward upturned end 39 and is provided with a downwardly-extending pin 40 movable in a slot 41 formed in the plate 27. A coil spring 42 has one end attached to the pin 40 and its other end secured to a fastening element 43 on the bottom of the block 28. The spring 42 tends to draw the front clamp 37 rearwardly to the extent permitted by the slot 41 and slot 38.

The rear clamp 44 is similar to the front clamp and has an upturned end 45. Clamp 44 has a downwardly projecting pin 46, movable in a slot 47, said pin being attached to one end of a coil spring 48 having its opposite end attached to a fastening element 49 secured to the bottom of the plate 27. The clamp 44 is slidable in a dove tail slot 50.

When it is desired to attach the platform or shelf to a cart, the block 28 is inserted into the opening 26 and when the platform is then pressed downwardly, it will spring into place on the under-carriage, the block 28 entering opening 26 and the lugs 30 engaging the arms 11. This engagement of the parts holds the platform firmly in place against forward, rearward and lateral shifting movement.

A package or container, indicated in the dot-and-dash lines in FIG. 1, when placed upon the platform or shelf, is held in the embrace of the several clamps 32, 37 and 44. The package is seated on the platform by moving the clamps apart against the force of their respective springs 36, 42 and 48, and then the clamps are allowed to return under the influence of these springs to engage the sides of the package or carton, thus holding it lightly but with sufficient force to prevent it from toppling or shifting during the travel of the cart. When it is desired to nest the cart with another cart, the platform may be quickly removed by merely raising it upwardly, thus freeing it from its engagement with the under-carriage.

In many respects it will be understood that the details herein described and illustrated may be altered by those skilled in the art, without necessarily departing from the spirit and scope of the invention as expressed in the appended claims.

What is claimed is:

1. A platform for a shopping cart comprising a base member constituting a supporting shelf for goods, a plurality of downwardly directed projections on the bottom of the base member for detachably engaging parts of the under-carriage of the shopping cart to removably attach the platform thereto, a plurality of adjustable clamps slidably mounted on the upper side of the base member, the top of the base member being grooved for the slidable reception of the clamps portions of said clamps extending below said base member, and spring means located on the under side of the base member and connected to said portions for urging said clamps toward one another to enable them to engage a package between them.

2. A platform for use on a shopping cart having an under-carriage provided with a V-shaped frame of tubular metal including a cross member near its forward end, the platform consisting of a shelf having a block on its underside fitting between the cross member and the forward end of the frame, the shelf including a pair of spaced downwardly projecting lugs frictionally engaging the outer sides of parts of the frame to cooperate with the block in detachably securing the platform on the frame, the shelf being provided with a plurality of grooves located at right angles to one another, pairs of clamps slidable in the grooves members projecting downwardly from said clamps below said shelf, and springs connected to said members and operative below the shelf for urging the clamps in each pair toward each other.

3. A platform for removable use on a shopping cart having an under-carriage provided with a V-shaped frame of tubular metal, said frame including a cross member near its forward end but spaced therefrom to provide an opening between said cross member and the forward end of the frame, said platform comprising a shelf in the form of a flat plate seated on top of the frame at the forward end thereof and projecting beyond the side edges of the frame, the shelf being provided near its forward end with a downwardly-projecting arcuately-shaped resilient plastic member fitting in the space between the cross member and the forward end of the frame, the shelf having lugs engaging parts of the frame rearwardly of its forward end and cooperating with the arcuately-shaped member in holding the shelf on top of the frame, the upper surface of the shelf being grooved, clamps slidable in the grooves and arranged to hold a package resting on the shelf between them, the shelf being slotted, projections on the clamps extending through the slots and emerging therefrom below the shelf, and springs engaging the projections beneath the shelf and tending to draw the clamps toward one another.

4. A platform for removable use on a shopping cart having a frame including a forward end and rearwardly diverging side members, and a cross member secured to said side members near said forward end, said cross member and forward end forming an opening between them, said platform comprising a plate seated on top of said frame at said forward end, a block of relatively resilient material projecting downwardly from said plate, said block having an external contour identical to but slightly larger than said opening, whereby said block may be forced into said opening and held snugly therein, and spring urged clamps slidably mounted on said plate for engaging and holding a package on the upper face of said plate.

References Cited in the file of this patent

UNITED STATES PATENTS

| | | |
|---|---|---|
| 1,837,664 | Longan | Dec. 22, 1931 |
| 2,174,661 | Hope et al. | Oct. 3, 1939 |
| 2,321,232 | Morando | June 8, 1943 |
| 2,890,058 | Cauthon | June 9, 1959 |
| 2,906,542 | Hoedinghaus et al. | Sept. 29, 1959 |

FOREIGN PATENTS

| | | |
|---|---|---|
| 143,730 | Great Britain | June 3, 1920 |
| 114,629 | Sweden | July 31, 1945 |
| 661,981 | Great Britain | Nov. 28, 1951 |